United States Patent
Leistner

[11] Patent Number: 5,909,993
[45] Date of Patent: Jun. 8, 1999

[54] CHIPPED NAIL WELDED WIRE NAILING STRIP AND METHOD

[75] Inventor: Walter H. Leistner, Scarborough, Canada

[73] Assignee: Sigma Tool & Machine, Scarborough, Canada

[21] Appl. No.: 08/969,067

[22] Filed: Nov. 12, 1997

[51] Int. Cl.$^6$ ..................................................... F16B 15/08
[52] U.S. Cl. ........................... 411/442; 411/966; 206/345
[58] Field of Search ..................................... 411/442, 443, 411/444, 451, 966; 206/345, 346, 347

[56] References Cited

U.S. PATENT DOCUMENTS

| 3,711,931 | 1/1973 | Ladouceur et al. | 411/966 X |
| 4,343,579 | 8/1982 | Shelton et al. | 411/442 |
| 5,060,797 | 10/1991 | Sygnator | 411/442 X |
| 5,482,420 | 1/1996 | Gagriel et al. | 411/966 X |

FOREIGN PATENT DOCUMENTS

| 1511884 | 2/1968 | France | 411/451 |

Primary Examiner—Neill Wilson

[57] ABSTRACT

A nail having a shank formed with at least one shallow chipped recess, so as to provide nail recesses of a precise predetermined depth, and a strip of such recessed nails, in which wires are welded to the nails in respective chipped recesses. Two or more such recesses may be formed in each nail.

The nails may either be arranged in a diagonally staggered fashion with their heads overlapping, or may be spaced further apart so that they are parallel, with their heads aligned, but in which the heads do not overlap.

Also disclosed is apparatus for forming a strip of nails having recesses, and having at least two spaced apart rotary chipping tools, operable to form spaced apart recesses in the nails, at least two wire welding stations aligned with the recesses in the nails and strip wire supplies, and welders to weld the strip wires in the recesses forming the nails into a strip, and a method of forming a wire welded strip of recessed nails.

6 Claims, 3 Drawing Sheets

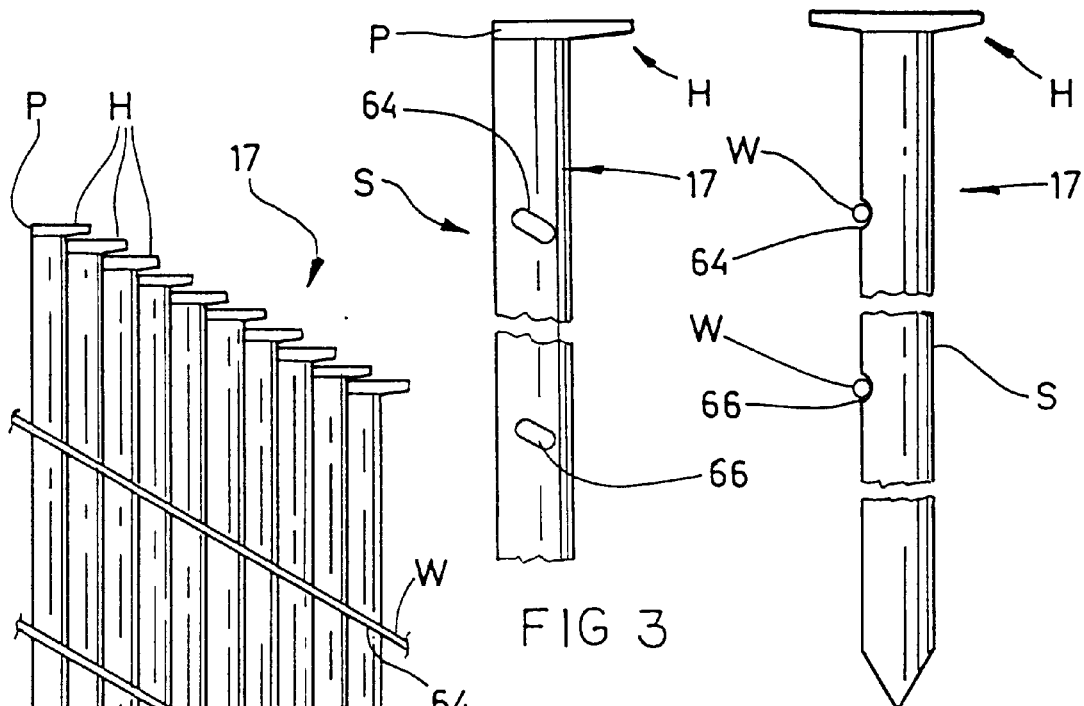
FIG 3
FIG 4
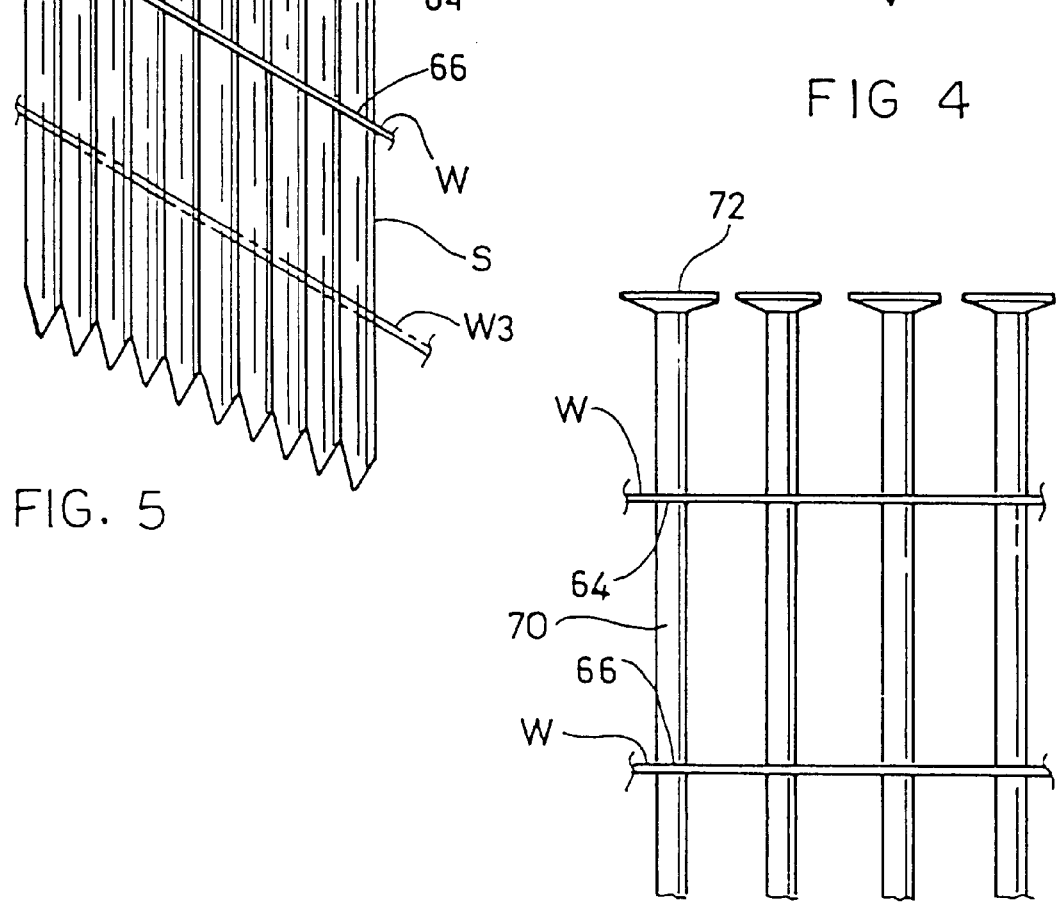
FIG. 5
FIG. 6

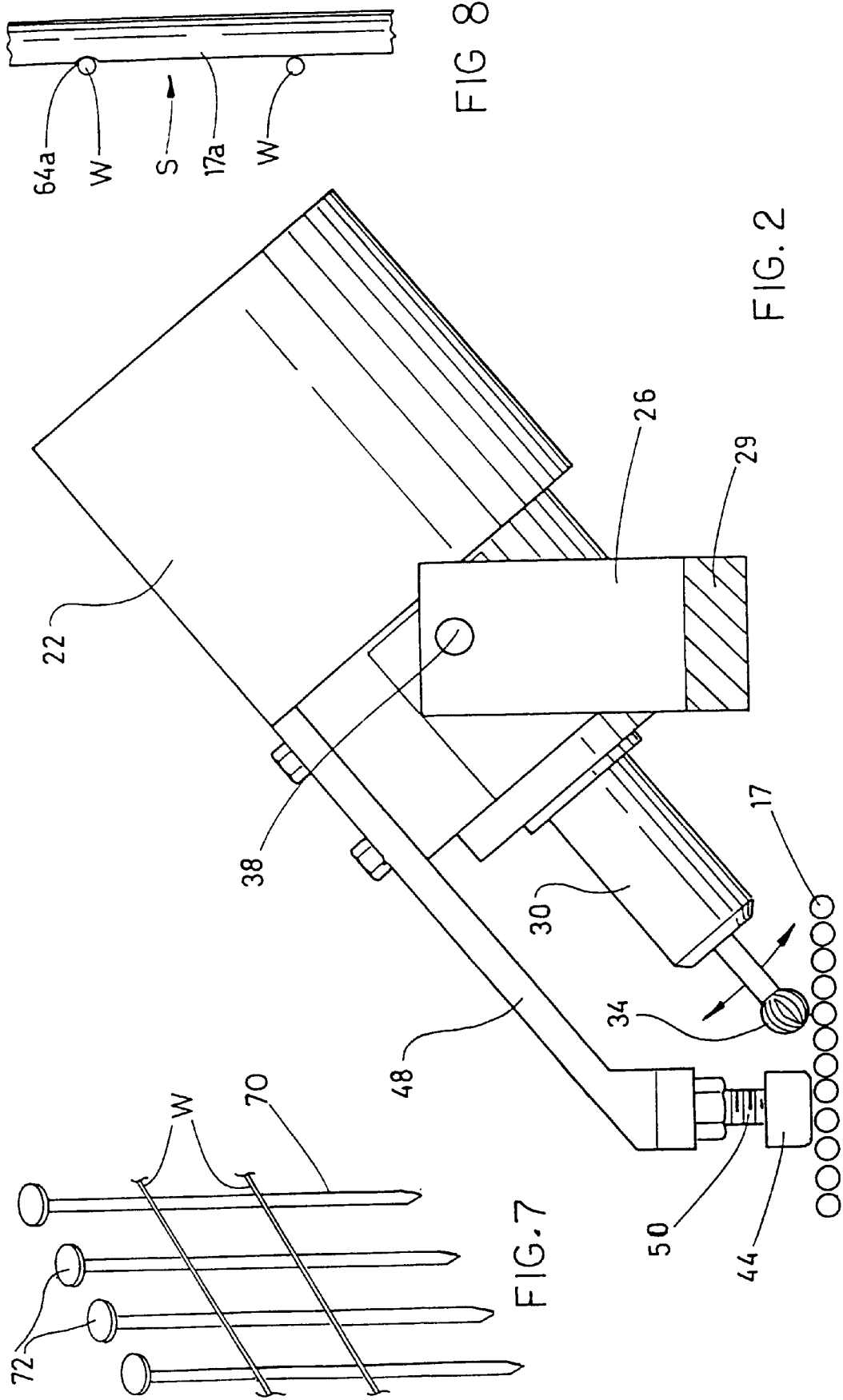

CHIPPED NAIL WELDED WIRE NAILING STRIP AND METHOD

FIELD OF THE INVENTION

The invention relates to nails formed with chipped recesses, and to welded wire nailing strips, in which the wire is welded in the chipped recess to form the nails into a strip, and to a method of forming a strip of chipped nails welded to wires.

BACKGROUND OF THE INVENTION

Nailing strips, consisting of strips of nails bonded together in various ways are required for a large number of different industrial applications. In some cases they are used in nailing applicators in which a strip of nails is used in a straight magazine, the strip being formed with the nail shanks in a generally diagonal fashion, so that the nail heads of each nail overlap, and the nail shanks are close alongside one another. In other cases, nailing strips are used in drum magazines. In this case, the nailing strip is commonly formed with the nails parallel to one another with their heads spaced apart, so that the strip of nails may be wound into a relatively long coil, which is inserted into the drum.

In either case, various different systems have been used for joining the nails together. In some cases the nails are joined simply by adhesive paper, or adhesive plastic. In other cases the nails are held together by various forms of adhesive or glue, usually a hot melt type of adhesive. Usually nailing strips of this type are relatively speaking, inflexible and are only suitable for use in the type of nailing applicators having a straight magazine, and are not generally speaking, suitable for use in nailing applicators using a drum magazine.

There have been numerous attempts to provide nails which are formed into a strip by welding parallel lengths of wire to the nail shanks at spaced intervals. This has numerous apparent advantages over using paper or adhesive. Paper is torn easily and the nailing strip may become separated, causing machine down-time.

Nailing strips in which the nails are bonded together adhesively are relatively inflexible and are only suitable for nailing applicators having a straight magazine. In addition, such adhesively bonded nail strips must be handled carefully, since the strips are easily broken during shipping and handling. An additional disadvantage of this system is that the dried adhesive separates from the nail shank as it is driven in and accumulates around the work place. Unless the work location is cleaned at regular intervals the debris will collect and eventually cause an inconvenience.

Accordingly, the use of parallel wires to join nails into a strip has great advantages over other systems. In the past in fact, nail strips in which the nails are joined together with welded wires have achieved considerable popularity. There are however, known problems in relation to wire welded strips of nails. The wires must be relatively thin and flexible, so as to avoid difficulties in insertion of the nail and in the separation of the nail from the rest of the strip.

The wires make point to point contact with the individual nails, so that the actual contact area is quite small. The actual time during which current can flow from the welding machines to the wires and thus to the nails is thus restricted by the small area of contact between the wires and the nails themselves.

Such strips are formed automatically and the welding machines which are used to form the welds must be set to precise tolerances. If there is any tendency for the welding current to increase beyond a preset limit, the strip wires may be burned through at the location of the weld. On the other hand, if the welding current is too low, then the weld joint will be inadequate and the nail will become separated from the strip wire.

It is well known that the principle cause of this problem is the fact that as the wire to be used for making the nails is drawn through the typical drawing die, the die drawing compound forms a surface layer on the nail.

It is this surface layer which causes most of the difficulties to achieving a precise weld of the strip wire to the nail. The surface layer tends to obstruct the flow of electricity between the strip wire and the nails so that the welds are improperly formed.

It will of course be appreciated that the automatic welding machines must operate at high speed for economy. They contact the strip wire where it contacts the nail only for a fraction of a second, and any interference with the flow of current will tend to cause problems for the welding equipment and will result in failed welds. Increasing the current burns the strip wire and causes sparks to fly around the work place. The problem is particularly bad with coated nails such as zinc coated nails.

Cleaning away of the surface layer of the nail at the point of the weld seems, at first sight, to be an obvious solution to the problem. However, the various cleaning methods that are available, such as grinding, sanding, chemical treatment and the like produce inconsistent results, so that the welds are unpredictable.

Clearly, it is desirable to provide a system for removing the surface layer at the two locations where the strip wires will be welded, in a manner which leaves a clean, dry contact surface for producing perfect and consistent welds between the wires and the nails.

BRIEF SUMMARY OF THE INVENTION

With a view to overcoming the various problems described above, the invention comprises a nail having a shank formed with at least one shallow recess, the recess being formed by a chipping tool, so as to provide a recess of a precise predetermined depth for making contact with a strip wire to produce a consistent secure weld.

The invention further comprises the provision of a strip of such chipped recess nails, in which there are two such recesses formed in each nail shank spaced apart from one another, and there are two parallel wires welded to the nails in respective chipped recesses.

In accordance with the invention however many advantages can be achieved by the provision of only a single chipped recess in each nail, so as to provide consistent secure welds to one wire at each chipped recess, and in which the other wire may simply be welded to the shank of the nail, without a chipped recess being formed.

The nails may either be arranged in a diagonally staggered fashion with their heads overlapping, or may be spaced further apart so that they are parallel, with their heads aligned, but in which the heads do not overlap.

The invention is not restricted one or two such chipped recesses and wires, but in fact three such recesses and wires may be used if desired, for appropriate purposes.

The invention further comprises apparatus for forming a strip of nails having chipped recesses, and comprising a nail conveyor, at least one rotary chipping tool, adapted to contact the surface of each nail, and operable to form chipped recesses in said nails, at least two wire welding stations, spaced apart with one station aligned with said at least one chipped recess in said nails and strip wire supplies for said stations, and operating means for operating said welding stations to weld said strip wires to said nails thereby forming said nails into a strip.

The invention further comprises apparatus incorporating two spaced apart rotary chipping tools, the tools being operative to a form spaced apart chipped recesses in each nail shank, and said wire welding stations being adapted to unwind wire in alignment with respective said chipped recesses, and welding means for welding said wires in said chipped recesses.

The invention also provides a method of forming a welded wire strip of nails using such apparatus.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 2 is an enlarged side elevation of one of the chipping tools shown in FIG. 1;

FIG. 3 is a greatly enlarged side elevation of nail partially cut away, and showing the two chipped recesses formed in the nail shank;

FIG. 4 is and end elevation of a nail showing two wires welded in the recesses;

FIG. 5 is a side elevational view of a diagonal axis nailing strip illustrating the invention, in which the nail heads are overlapped;

FIG. 6 is a side elevation of an alternate form of nailing strip, in which the nails are parallel and spaced apart from one another so that the heads do not overlap, enabling such a strip to be wound into a coil;

FIG. 7 is a perspective illustration of a diagonal strip of nails, having full heads, corresponding to the nails shown in FIG. 6; and FIG. 8 is a section of a nail shank having only a single chipped recess, and there being one strip wire welded in the chipped recess, and a second strip wire is simply welded to the surface of the nail shank.

DESCRIPTION OF A SPECIFIC EMBODIMENT

Figure 1:
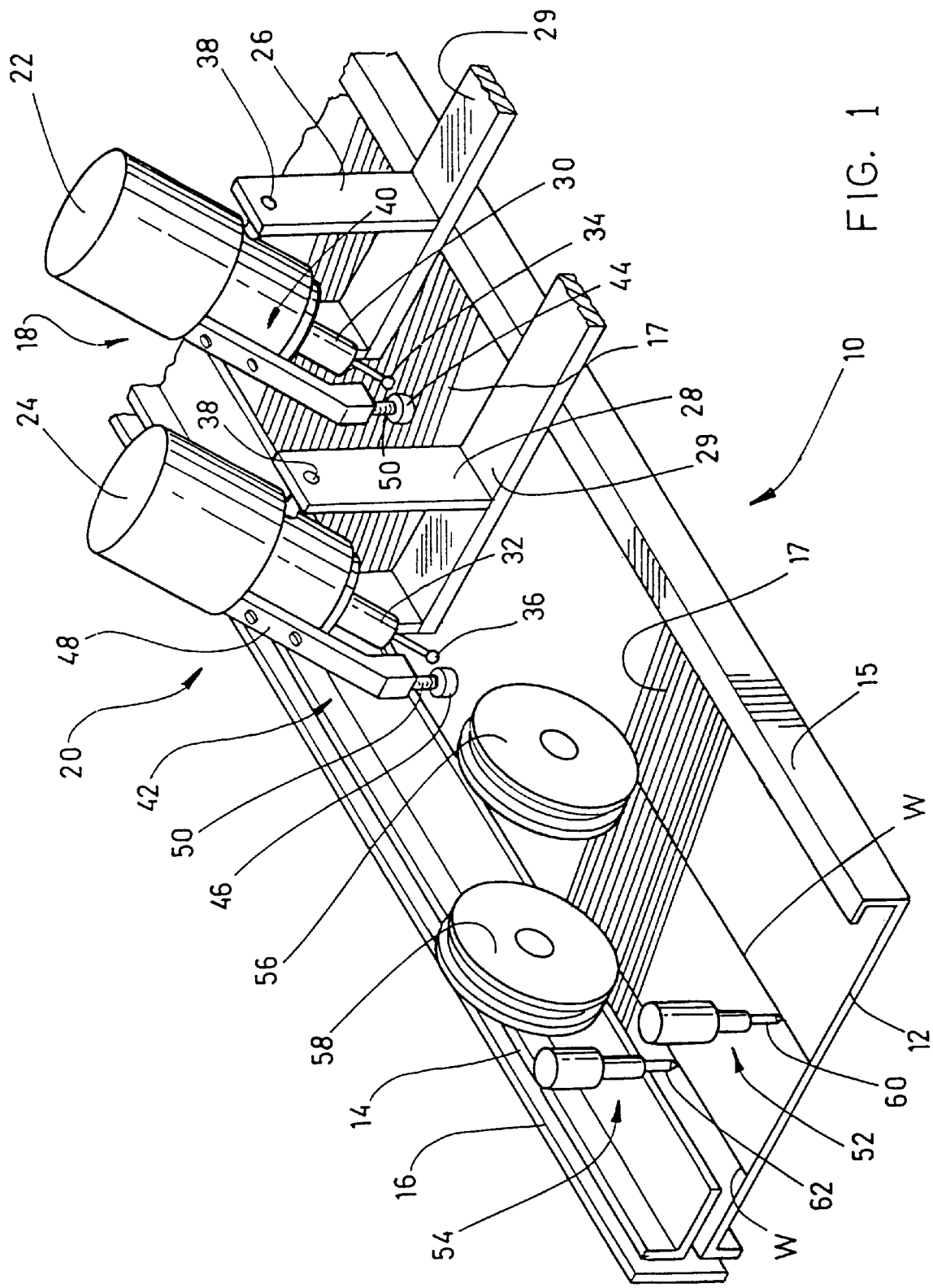
FIG. 1 is a schematic perspective illustration of a wire nailing strip forming apparatus, illustrating aspects of the invention.

As already explained, the invention is directed generally to the provision of nails which can be welded securely and accurately to strip wires, and which nails have chipped recesses formed in their shank.

As explained above, the main cause of imperfect welds between strip wires and the nail shanks is the coating which is left on the nail shank by the drawing compound, which is used during the drawing of the wire.

Another cause of the problems is the fact that the strip wires are of small diameter, and they will make a point to point contact with the nail shank, over a very small area, such that the flow of electricity becomes inconsistent, and the welds are uncertain.

In order to overcome this problem, the invention employs apparatus, one version of which is illustrated in FIG. 1, so as to remove a small portion of this surface coating, along with a small fragment of the nail shank itself, so as to leave a recess in the nail shank, where the strip wire can be welded without interference from the coating on the shank.

FIG. 1 illustrates an apparatus, which is shown here for the purpose of illustrating the invention and without limitation.

As shown in FIG. 1, the apparatus consists of a strip forming track 10, having a lower supporting portion 12 and upper registering portions 14, 15 and 16. Such nail supporting tracks are in common usage in the nail strip forming art and require no special description. They generally speaking support the nails horizontally, although they can be at an angle or vertical. The nails are pushed along the track by a pusher (not shown) of well known design, so that the nails are maintained closely adjacent to one another in the track.

In one form of track, the nails can be arranged parallel to one another, with their heads in contact edge to edge. In another form of nail support, as illustrated the nails can be supported so that they pass along the track with each nail on a generally diagonal axis, with their nail heads overlapping. In this case, it is customary to use nails with specially formed nail heads with recessed or cut away portions. The purpose of these recesses or cut away portions is to permit the nail heads to overlap, and to permit the shank of one nail to enter into the cut away portion of the head of the next nail and so on, so that the shanks can be in side by side contact, to save space.

All of this is very well known in the art and requires no special description.

In the apparatus illustrated here, the nails 17 pass under two nail chipping stations 18 and 20. The nail chipping stations 18 and 20 are spaced apart from one another so that they act on spaced apart locations on the nail shank. In addition, they are spaced apart from one another along the axis of the nail support 10, for reasons of convenience in building the machine, as will become apparent below.

Each of the nail chipping stations 18 and 20 consists of a motor 22–24, and a generally yoke shaped support 26–28, with the motor being supported between the opposite sides of the yoke support, so that it can be swung upwardly and downwardly. Support bars 29 support the yokes 26–28 over the nails 17 in the track.

Shafts 30 and 32 extend from respective motors 22 and 24, and at the free ends of shafts 30 and 32, there are generally spherically shaped cutting tools 34 and 36. The cutting tools have small teeth formed in a generally longitudinal fashion, from one end of the spherical shaped tool head to the other. Rotation of the tool head will cause the teeth to sequentially engage a work piece, and chip small portions from the work piece. Such chipping tools of spherical shape are in many respects similar to tool bits used for example, in dentistry for drilling teeth, although obviously on a larger scale.

Each of the chipping tools assemblies is balanced more or less equally about the bearings 38 of their respective yokes 26 and 28, so that the chipping tools are biassed to swing downwardly, and the motors extend upwardly.

The chipping tools and shafts are angled at predetermined angles so as to bring the chipping tools into engagement with the shanks of the nails at the desired angle, so that operation of the tools will remove surface portions of the nail, and form slight indentations or recesses. In order to prevent the chipping tools from swinging downwardly into the spaces between the nail shanks, which might cause undesirable removal of excess metal from the shanks, where such removal is not required, adjustable tool stops 40 and 42 are provided on respective tools. The tool stops have abutments 44 and 46 adapted to rest lightly on the nail shanks, and arms 48 extend from the abutments 44–46 to the tools themselves. The abutments are on threaded shafts 50, and may be adjusted upwardly and downwardly, so as to provide precise stop locations for the tools, to prevent the tool bits from riding around the shanks of the nails 17 into the recesses between the shanks.

Downstream of the chipping tools, there are located two welding stations 52 and 54. The welding stations are supplied with strip forming wires W, which are supplied from wire uncoilers 56 and 58. The wires pass in registration with welding heads 60 and 62 which are connected to any suitable means of electrical power for spot welding of the strip wires to the nails.

The strip wires are aligned with the respective chipped recesses 64 and 66 (FIGS. 3 and 4) formed in the nail 17, so that when the welding current passes, it passes unobstructed through the strip wire W and through the shank of the nail 17, forming a good secure weld to each nail. The recesses in FIG. 3 are shown having axes diagonal to the axis of the nail shank.

It will of course be appreciated that the axes of the recesses will correspond to the angle between the welding wires and the nail shank. Where the welding wires make a right angle to the nail shanks then of course the recesses will likewise be located at a right angle to the nail shank.

Depending upon the type of strip being formed, the strips may be formed into coils, or they may be cut off in predetermined lengths, by means not shown but well known in the art, which are located downstream of the welding stations.

The method of forming the nailing strips of chipped recess nails is self-evident from the foregoing description of the apparatus, and consists of passing the nails with their shanks in registration with tools operating to chip the surface from the nails in predetermined spaced locations, after which the nails are passed in registration with strip wires and welding apparatus, which is operative to weld the strip wires to the nails in the regions where the surface has been removed.

For the sake of greater clarity, FIG. 2 illustrates one of the chipping tools in isolation.

For the sake of illustrating the nail 17 itself, when its surface has been chipped away in accordance with the invention, a typical chipped nail 17 is shown in FIG. 3, with part of its shank cut away for the sake of clarity and in order to enlarge the scale of the drawing.

The nail 17 has a shank S and a head H. It is formed with two chipped recesses 64 and 66, which will be seen to be shallow surface depressions in the shank S of the nail 17. The surface depressions may be just enough to remove that portion of the surface coating which interferes with the effective transmission of electrical current, and leaves a clean metal nail surface ready to receive the strip wires W and the welds.

As mentioned above, nails may be formed into two types of strips. FIG. 5 illustrates a diagonal axis nailing strip in which the nail heads H are overlapped. Portions P are cut away from the nail heads, in registration with the shanks of adjacent nails. In this way the nails may be aligned in a diagonal strip with the nail heads overlapping, and with the shanks in closely abutting relationship. The strip wires W are welded into diagonal axis recesses 64 and 66 in the nail shank S as described above.

Such diagonal axis nailing strips are usually used in nailing applicators having straight magazines, and the nailing strips may be cut into groups of twenty to thirty nails in a strip, and simply inserted into the magazine for application by the nail applicator. The applicator will separate the endmost nail from the strip by breaking the strip wires in a manner well known in the art and requiring no description.

In other embodiments, a larger number of nails 70 (FIG. 6) may be rolled or coiled into a coil of nails (not shown). In this case the nail heads 72 do not overlap, but are juxtaposed side by side as shown in FIG. 6. There is no cut away portion in the nail heads 72, since this is not required, and the nail shanks are spaced apart from one another and lie parallel such full-headed nails have advantages in some applications. In this case, the recesses would have axes being normal to the axis of the nail shank.

The strip wires are welded to chipped recesses 64–66 in the nails in the manner described above, and the nails are then rolled or formed into coils (not shown). The nails in such coils may then be inserted into a drum magazine for different type of applicator, also well known in the art and requiring no description. Such a coil of nails may comprise up to 250 or more nails, and enables the use of nails with full heads 72, all of which may have considerable advantages in certain circumstances depending upon the end use required.

In another embodiment using such full headed nails 70, as shown in FIG. 6, such full headed nails may be formed into a diagonal strip as shown in FIG. 7. In this case also, the nails will be spaced well apart along the wires, so as to leave plenty of room for the heads 72.

In a further embodiment, substantial improvements over existing welded wire nail strips may be achieved by using the embodiment as illustrated in FIG. 8. In this case, a nail shank S of nail 17A is formed with a single chipped recess 64A, receiving one wire W, in the manner described above.

The other wire W is simply welded in point to point contact with the surface of the nail, as in prior art wire welded nail strip.

Even in this case, there will be substantial improvement in the security of the welds between the wire and the strip, and the strip will be found to have greatly improved durability and usefulness as compared with strips formed with wires W which are welded in the conventional way directly on the surface of the nail shank.

While the invention has been described in relation to the use of two such wires W, it will of course be appreciated a third, or more such wires W may be required. An additional third wire W3 is illustrated in phantom in FIG. 5.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A nail having a shank and comprising;
   at least two shallow recesses in one side of said shank, said recesses being formed by chipping tool means, so as to provide recesses of a precise predetermined depth on the same side of the shank of each said nail, said recesses being adapted and located to receive strip wire material, welded in said recesses, and wherein there are at least two said wire strips, said wire strips being welded in respective said recesses whereby to form parallel welded wire strips welded to said recesses in said nail shanks.

2. A strip of chipped recess nails and comprising a plurality of nails arranged adjacent to one another in parallel relation, said nails having shanks;
- at least one shallow recess formed in said shank of each said nail, formed by chipping tool means so as to provide a series of recesses in said shanks aligned with one another; and,
- a wire strip aligned with said recesses and welded to said shanks in said recesses whereby to form said nails into a strip.

3. A strip of chipped recess nails as claimed in claim 2 and wherein there are at least two said shallow recesses in each said shank of each said nail, said recesses being aligned with adjacent recesses in adjacent said nails, and wherein there are two said wire strips aligned with respective said rows of recesses, and welded to said nail shanks in said recesses, whereby to form said nails into a strip.

4. A strip of chipped recess nails as claimed in claim 2 wherein said nails are arranged in a diagonally staggered fashion with their heads overlapping, and wherein said recesses are located at a diagonal angle relative to the axis of said shanks.

5. A strip of chipped recess nails as claimed in claim 2 wherein said nails are arranged in spaced apart fashion, with their heads spaced apart from one another, and wherein said recesses are angled diagonally of said axis of said nail shanks.

6. A strip of chipped recess nails as claimed in claim 2 wherein said nails are spaced apart from one another so that they are parallel and with their heads aligned with one another, but free of overlapping, and wherein said chipped recesses are formed along axis 90 degrees to the axis of said nail shanks.

* * * * *